UNITED STATES PATENT OFFICE.

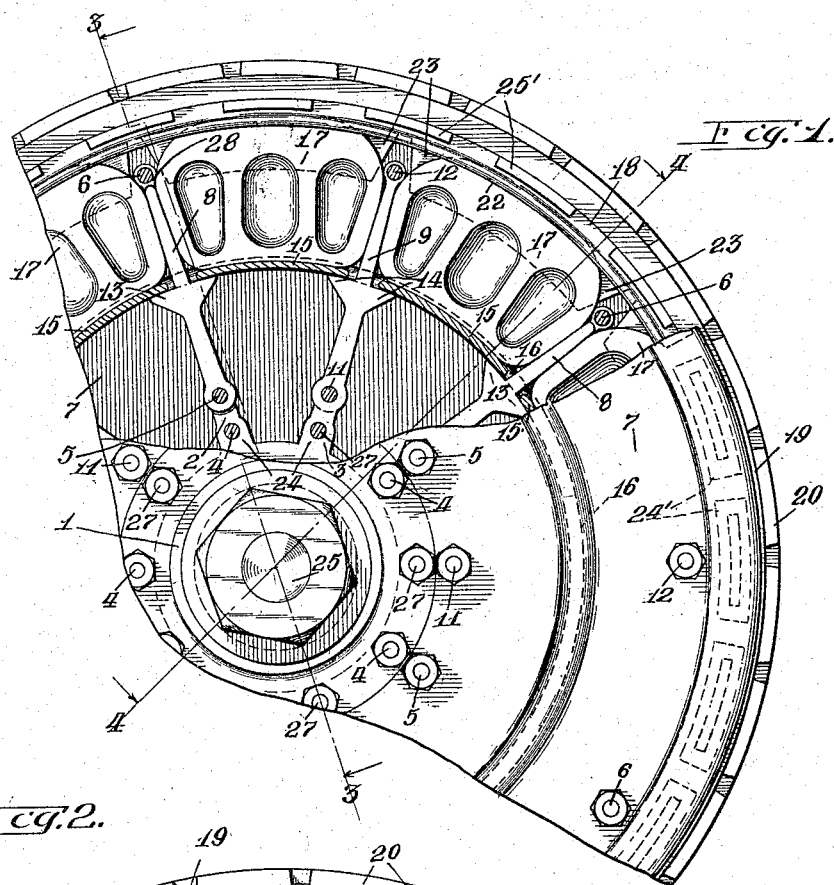

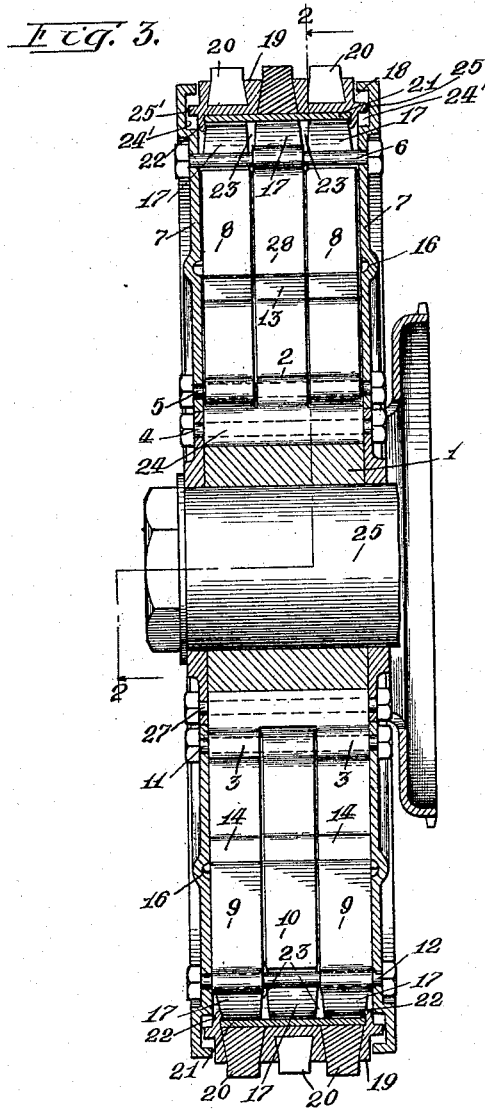

FRANKLIN A. FROMMANN, OF CHICAGO, ILLINOIS, ASSIGNOR TO OLIVE FROMMANN, OF CHICAGO, ILLINOIS.

VEHICLE-WHEEL.

1,202,048.  Specification of Letters Patent.  Patented Oct. 24, 1916.

Application filed December 4, 1912. Serial No. 734,875.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels and more particularly to the class of wheels used on self-propelling vehicles for drawing heavy loads, such as automobile trucks; although my invention may also be utilized on a variety of other types of vehicles, such as the common sizes and styles of automobiles.

In view of the heavy expense entailed by the use of rubber tires, both for their first cost and for their maintenance, it has already become customary to build wheels for such vehicles with tires having tread blocks of wood (or other inexpensive materials) and having cushioning means interposed between the tire and the hub of each wheel to afford the needed resiliency.

While this is the general class of wheels to which my invention relates, it is particularly applicable to wheel constructions of the types shown in Letters Patent No. 1009062, granted to me November 21, 1911; and also to the type shown and described in my copending application, filed July 29, 1912, as Serial No. 712,021.

The object of my invention is to construct a wheel of this general type having the interposed cushioning means so arranged that they can expand circumferentially in opposite directions from radial spokes or webs, thereby allowing these cushions to distribute and equalize the strains over a considerable portion of the wheel.

In one embodiment of my invention, it is particularly adapted for use with the tire construction described and claimed in my companion application, filed of even date herewith as Serial No. 734,876. It is shown in this embodiment in the accompanying drawings, in which—

Figure —1— is a fragmentary side elevation, partly in section, of a vehicle wheel embodying my invention. Fig. —2— is a sectional view of the same on the line 2—2 of Fig. —3—. Fig. —3— is a sectional view on the line 3—3 of Fig. —1—. Fig. —4— is a fragmentary sectional view on the line 4—4 of Fig. —1—.

In the embodiment of my invention shown in the drawings, the wheel comprises a hub 1 having a plurality of radially disposed single-stemmed spokes 2 and bifurcated spokes 3 alternating consecutively with each other around the circumference of the hub. Each of the single-stemmed spokes 2 has a perforated base portion 24, extending parallel to the axle 25 of the wheel from one of the side plates 7 of the wheel to the other. The spoke 2 is rigid relative to the hub and side plates of the wheel. Pivoted upon the bolt 5 at either side of the shank 28 of the spoke 2, are partitions 8 extending substantially radially of the wheel. The main or shank portion of the spoke 2 is considerably longer than the adjacent pivoted partitions 8 and is perforated to allow another bolt 6 to pass through the outer end of the spoke 2 and the side plates 7.

Each of the bifurcated spokes 3 likewise is immovably connected at the hub of the wheel by a bolt 27, a pivot bolt 11 and an outer bolt 12, the bolt 12 passing through both shanks 9 of the bifurcated spoke near their outer ends. Between these shanks 9 a partition member 10 is pivotally mounted upon the bolt 11, this member being short enough to readily clear the outer bolt 12 when the member 10 is swung about bolt 11 as its pivot.

The shank 28 of each single-stemmed spoke 2 has projections 13 formed upon it intermediate of its length; likewise each shank portion 9 of every bifurcated spoke 3 has projections 14 upon the same, all of these projections 13 and 14 being equidistant from the center of the axle 25 of the wheel. Likewise, there are similarly disposed projections upon the movable partition members 8 and 10. These projections serve as supports for plates 15, which plates are engaged at their opposite sides by annular grooves 16 in the side plates 7 of the wheel. When thus assembled, the plates 15 comprise successive sections of an annular formation having a gap at each spoke wide enough to admit the outer portion of the spoke and also to permit of relative motion between the fixed spokes 2 and 3, and the movable partitions 8 and 10. Supported upon these plates 15 are cushions 17, shaped to conform substantially to the contour of the pockets formed between contiguous spokes and partitions outwardly of the plates 5. These cushioning members 17 may be of any suitable material, such as rubber, and are made of greater depth than the said pockets so as to project outwardly considerably beyond the outer ends of the spokes and partitions.

The outer ends of all of the cushion members 17 are preferably shaped so as to form portions of a cylindrical formation, whereby they may all bear simultaneously against the inner surface of a continuous rim or tire 18. This rim 18 is prevented from lateral movement by the side plates 7 of the wheel (which plates are of greater outside diameter than the base of the rim) but is free at every point of its circumference to move somewhat radially of the wheel. The rim or tire 18 may be of any suitable construction, but is shown in the drawings as corresponding to what is more particularly described and claimed in my companion application filed of even date herewith as Serial No. 734,876. The tire thus constructed comprises an outer ring 19 having tread blocks 20 suitably mounted within openings in said ring, these tread blocks being held in their projected positions in said openings by means of an inner ring 21 disposed between and held in place by the side flanges 22 of said ring 19. The side flanges 22 contact with the inner faces of the side plates 7 during the radial movements of the tire member 18 against the action of the cushioning members 17. On the inner circumferential face of the ring 21 are ribs or projections 23, which are adapted to project between contiguous resilient blocks or cushions 17. These ribs 23 extend inwardly at intervals along the circumference of the ring 21 and to a depth to cause them to project past the bolts 6 and 12 with which they are adapted to engage to prevent the rim from creeping more than a given distance around the inner rim; that is to say, each of said ribs 23 is somewhat shorter than the length of a pocket containing a set of blocks 17 in the direction of the circumference of the wheel, so that creeping of the outer rim in either direction from its normal position will cause said ribs to strike the bolts 6 or 12 to limit such creeping movement.

While I preferably limit the circumferential movement of the rim with respect to the side-plates of the wheel by ribs 23 extending to a depth adapted to engage the bolts 6 and 12, the same effect may be supplemented by pockets 24' arranged at intervals on the inner faces of the side plates 7, and contiguous to the periphery of the latter as shown in Figs. —1— and —3—. Lugs or projections 25' on the side edges of the ring 19 projecting into the said pockets 24' will restrict the circumferential motion or creeping of the rim member and by making these lugs of less thickness than the radial width of the said pockets, they will permit a radial movement of the rim inwardly and outwardly of the wheel for an ample distance to afford the desired cushioning effect.

The block or cushion 17 will probably be most advantageously made of rubber, though, of course, any other suitable material may be substituted. It is well known that rubber is substantially incompressible, but that pressure upon one part thereof will cause a displacement of the material of the portion upon which the pressure is placed, the resiliency being due to the fact that the displaced material will immediately return to its normal position upon release of the pressure. Thus upon a movement of the rim against the cushioning action of said cushions 17, a portion of the rubber of which the latter are preferably composed will be displaced and such displacement can most advantageously take place at the ends of the cushions. A movement of the end portions of the cushions will thus take place and cause the latter to impart pivotal movement to the partitions 8 and 10 of the spoke formation, whereby such displacement is transmitted in the form of end pressure upon the cushions 17 in the contiguous pockets. By thus transmitting some of the displacement to the cushion-block on the opposite side of the pivoted partition against which one end of the cushion under pressure impinges, the strain is distributed over a number of contiguous cushions instead of all coming upon one. Besides, the movement of the pivoted partition allows the cushion upon which the pressure comes to expand circumferentially for a sufficient amount to utilize its proper cushioning effect.

It will be evident from the drawings that the wheel of my invention provides three sets or circles of such cushion members, each set having adjoining cushions adapted to coöperate in sharing the displacement and the strain, through the action of the pivoted partition intervening between the same. Consequently, the strains will be continually distributed not only between the three sections of the wheel, but also between the cushions in each section of the wheel.

While I have shown and described my invention in a desirable embodiment utilizing wheel elements covered by the previous patent and the copending applications heretofore mentioned, I do not wish to be limited to the particular combination which I have here depicted. Nor do I wish to be limited to the materials or details herein described, as it will be evident that manifold changes may be made in both the form and structure of such a vehicle wheel without departing from the spirit of my invention.

What I do claim as new and desire to cover by Letters Patent is:

1. In a wheel, the combination of a plurality of center-stemmed spokes alternating with bifurcated spokes, each center-stemmed spoke having a pair of partitions pivoted on opposite sides of the stem; each bifurcated spoke having a partition pivoted between its bifurcations; side plates between which said spokes and partitions are mounted; supporting plates carried by the said spokes and partitions; cushioning elements inserted in the pockets formed by the said spokes, supporting plates, partitions and side plates; and a rim adapted to engage the outer surfaces of the said cushioning members.

2. A wheel including a pair of side plates, a plurality of spokes rigidly secured thereto, the consecutive spokes alternately equipped with a rigid central stem and with a rigid bifurcated formation; a partition pivoted substantially radially in each of the bifurcated spokes; supporting plates carried by each consecutive pair of spokes; a tire formation incasing the said spokes intermediate of the said side plates; and a cushioning member interposed between the supporting plate and the tire, the said cushioning member having its ends butted respectively against the central-stemmed spoke and the said partition.

3. A wheel including a pair of side plates, a plurality of spokes rigidly secured thereto, the consecutive spokes alternately equipped with a rigid central stem and with a rigid bifurcated formation; a partition pivoted substantially radially in each of the bifurcated spokes; supporting plates carried by each consecutive pair of spokes; a tire formation incasing the said spokes intermediate of the said side plates; and a cushioning member interposed between the supporting plate and the tire, the said cushioning member having its ends butted respectively against the central-stemmed spoke and the said partition.

4. A wheel including a plurality of sections adjacent to one another axially of the wheel, each section having alternate rigid spoke formations and approximately radial pivoted partitions; and cushioning members interposed between the consecutive spokes and partitions; the rigid spoke formation in each section being alined with the pivoted partition in the adjoining section and supporting blades carried jointly by the laterally adjacent spokes for supporting the cushioning members.

5. A wheel including a plurality of sections adjacent to one another axially of the wheel, each section having alternate rigid spoke formations and approximately radial pivoted partitions; cushioning members interposed between the consecutive spokes and partitions; and a tire encircling the said cushioning members, the rigid spoke formation in each section being alined with the pivoted partition in the adjoining section, there being interengaging formations upon the tire and the spokes for limiting the movement of the tire circumferentially of the wheel and supporting blades carried jointly by the laterally adjacent spokes for supporting the cushioning members.

6. A wheel including a plurality of sections adjacent to one another axially of the wheel, each section having alternate rigid spoke formations and approximately radial pivoted partitions; and cushioning members interposed between the adjacent spokes and partitions; the rigid spoke formation in each section being alined with the pivoted partition in the adjoining section; and a rim formation engaging the said cushioning members and adapted to compress the latter radially, whereby the member thus compressed will be distended circumferentially, thereby causing the distended cushioning member to move the pivoted partition so as to transmit a portion of the strain to the cushioning member adjoining the other side of the said partition and supporting blades carried jointly by the laterally adjacent spokes for supporting the cushioning members.

7. A wheel construction including a plurality of sections alined axially of the wheel, each section including a pair of rigid spoke formations and a substantially radial partition mounted therebetween; and cushioning members interposed between the said partition and the said rigid spoke formation; the said partition being pivoted so as to be movable by the pressure of a distended cushioning member against the same, whereby the movable partition permits the said pair of cushioning members to equalize the strains in the same and supporting blades carried jointly by the laterally adjacent spokes for supporting the cushioning members.

8. A wheel construction including a plurality of sections alined axially of the wheel; each section including a plurality of circumferentially disposed cushion blocks; a plurality of spokes, and a plurality of substantially radial pivoted partitions; there being a pair of the said cushion blocks between each adjoining pair of spokes; one of the said pivoted partitions being interposed between each of the said pairs of cushion blocks and supporting blades carried jointly by the laterally adjacent spokes for supporting the cushioning members.

9. A wheel construction including a plurality of sections alined axially of the wheel; each section including a plurality of circumferentially disposed cushion blocks; a plurality of spokes, and a plurality of substantially radial pivoted partitions, and a tire encircling the cushion blocks in all of the said sections; there being a pair of the said cushion blocks between each adjoining pair of spokes; one of the said pivoted partitions being interposed between each of the said pairs of cushion blocks and supporting blades carried jointly by the laterally adjacent spokes for supporting the cushioning members.

10. A wheel including a plurality of sections adjacent to one another axially of the wheel, each section having alternate rigid spoke formations and approximately radial pivoted partitions; and cushioning members interposed between the consecutive spokes and partitions; and a tire encircling the cushion blocks in all of the said sections; the rigid spoke formation in each section being alined with the pivoted partition in the adjoining section and supporting blades carried jointly by the laterally adjacent spokes for supporting the cushioning members.

In testimony whereof I have signed my name in presence of two subscribing witnesses.

FRANKLIN A. FROMMANN.

Witnesses:
M. M. BOYLE,
ALBERT SCHEIBLE.

Copies of this patent may be obtained for five cents each, by addressing the "Commissioner of Patents, Washington, D. C."